US009526083B2

(12) United States Patent
Sydir et al.

(10) Patent No.: US 9,526,083 B2
(45) Date of Patent: Dec. 20, 2016

(54) CELLULAR NETWORK SCANNING CONTROL BASED ON AMBIENT IDENTIFIABLE WIRELESS SIGNAL SOURCES

(71) Applicants: Jaroslaw J. Sydir, San Jose, CA (US); Anthony G. LaMarca, Seattle, WA (US)

(72) Inventors: Jaroslaw J. Sydir, San Jose, CA (US); Anthony G. LaMarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 13/728,186

(22) Filed: Dec. 27, 2012

(65) Prior Publication Data

US 2014/0187272 A1    Jul. 3, 2014

(51) Int. Cl.
*H04W 24/00*   (2009.01)
*H04W 64/00*   (2009.01)
*H04W 48/16*   (2009.01)
*G01C 21/34*   (2006.01)

(52) U.S. Cl.
CPC ........... *H04W 64/006* (2013.01); *H04W 48/16* (2013.01); *G01C 21/34* (2013.01)

(58) Field of Classification Search
CPC ...... H04W 12/06; H04W 36/32; H04W 48/02; H04W 48/04; H04W 4/12; H04W 76/021
USPC ..... 455/161.1, 456, 63.2, 91, 445, 424, 507, 455/414.1, 130
See application file for complete search history.

(56) References Cited

U.S. PATENT DOCUMENTS

| | | | |
|---|---|---|---|
| 2006/0270412 A1* | 11/2006 | Willins et al. | 455/445 |
| 2007/0026818 A1* | 2/2007 | Willins et al. | 455/91 |
| 2008/0032727 A1 | 2/2008 | Stephenson et al. | |
| 2008/0069062 A1* | 3/2008 | Li et al. | 370/338 |
| 2012/0004001 A1* | 1/2012 | Power et al. | 455/507 |
| 2012/0088498 A1* | 4/2012 | Xiao et al. | 455/424 |
| 2013/0262457 A1* | 10/2013 | Lian et al. | 707/724 |
| 2014/0179279 A1* | 6/2014 | Skeba et al. | 455/414.1 |

FOREIGN PATENT DOCUMENTS

WO    2014/105186 A1    7/2014

OTHER PUBLICATIONS

International Preliminary Report on Patentability and Written Opinion Received for PCT Patent Application No. PCT/US2013/048049, mailed on Jul. 9, 2015, 7 pages.
International Search Report and Written Opinion received for PCT Patent Application No. PCT/S2013/048049, mailed on Oct. 1, 2013, 10 pages.

(Continued)

*Primary Examiner* — Joseph Arevalo
(74) *Attorney, Agent, or Firm* — Forefront IP Lawgroup, PLLC

(57) ABSTRACT

Described herein are techniques related to reducing scanning in a cellular network. A mobile device reduces scanning of the cellular network when coverage holes are detected and/or predicted along a route traveled by or a place visited by the mobile device. A mobile device also reduces scanning of the cellular network when the mobile device is stationary. This Abstract is submitted with the understanding that it will not be used to interpret or limit the scope and meaning of the claims.

27 Claims, 6 Drawing Sheets

(56) References Cited

OTHER PUBLICATIONS

Wang et al., "A survey of movement strategies for improving network coverage in wireless sensor networks", 2009.
Wang et al., "Scan-Based Movement-Assisted Sensor Deployment Methods in Wireless Sensor Networks", IEEE Transactions on parallel and distributed systems, vol. 18, Jul. 2007, 14 pages.

* cited by examiner

CELLULAR NETWORK SCANNING CONTROL BASED ON AMBIENT IDENTIFIABLE WIRELESS SIGNAL SOURCES

BACKGROUND

The use of mobile devices, such as smartphones, is nearly ubiquitous. Many of these mobile devices include the capability to determine their physical location. That is, the mobile device is capable of determining its location in the physical world. Conventionally location determination is typically accomplished by using Global Positioning Systems (GPS), some form of triangulation or interpolation of multiple radio signals, internet protocol (IP) geo-location, or some combination thereof.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
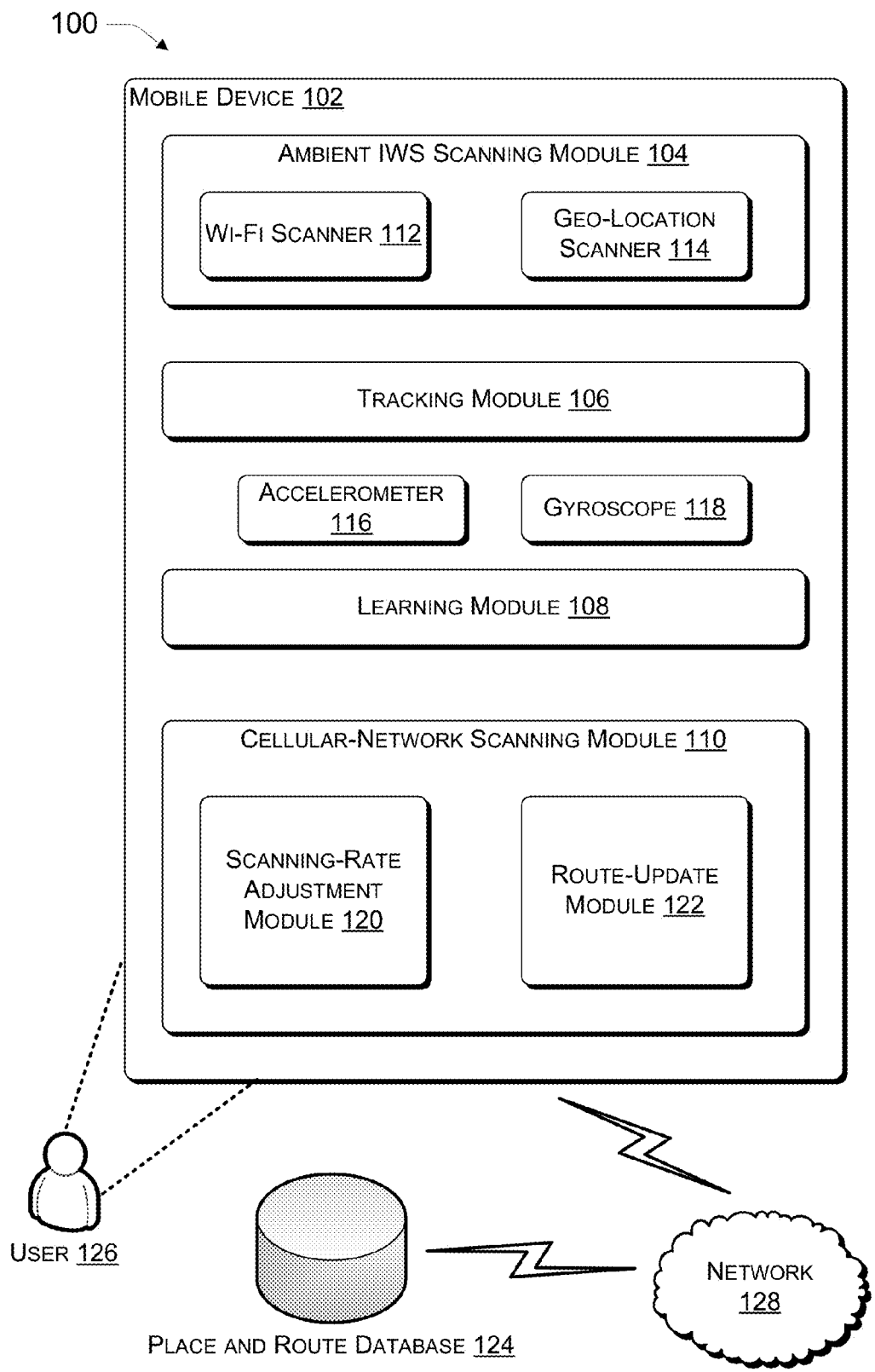
FIG. 1 shows an example system in accordance with the description herein.

Even in this age of pervasive cellular-phone service coverage and universal usage of cell phones, it is still the case that there are places with no cell coverage. This can be caused by a few factors. In some cases there are "dead spots" caused by interference by nearby sources of radio noise. Another cause is being underground such as a sub-basement or parking garage. In other cases, the place may simply be remote enough that the cellular companies have not provisioned it with towers. (Such is commonly the case with remote mountain towns.) For any one of these reasons, users may find themselves in a "coverage hole". Typically, when a device enters a coverage hole it behaves in one of two ways: First, it may choose to scan regularly for service in order to reestablish service as soon as it becomes available. This has the problem that it drains the battery quickly. The second behavior is to back off and scan infrequently once a coverage hole is noticed. This improves battery life, but because of the infrequent checks for service it may be many minutes after exiting the coverage hole that service is restored by the handset.

Disclosed herein are techniques whereby a mobile device performs reduced scanning of a cellular network in areas where a coverage hole is detected and/or predicted and resumes scanning quickly after emerging from the coverage hole. In one or more implementations, as the mobile device is traveling along a route it encounters ambient identifiable wireless signal (IWS) sources, such as Wi-Fi access points (APs). Typical routes that a user travels include from home to work (and back), home to school (and back), home to church (and back), home to the grocery store (and back), and so forth.

The mobile device tracks the ambient IWS sources and learns where the coverage holes exist. Coverage holes can exist in places or along routes. When the device enters a coverage hole, it will attempt to reestablish coverage at a reduced, power-saving rate. However, the device is also monitoring for ambient IWS sources that it knows lie outside the coverage hole. Once one of these IWS sources is observed, the radio in the mobile device scans the cellular network at a normal rate, searching for service.

At other times, the mobile device may be in a coverage hole outside of an area for which is has learned the IWS sources. In this case, the device does not know which IWS sources are associated with cellular coverage. Even in this case, ambient IWS sources can be used to help improve the performance of cellular coverage. If the device is stationary (sitting on a table, or in a user's pocket while they sit still) the device will observe a set of nearby IWS sources that will not change. Once the device has checked for cellular coverage and found it lacking, it need not check again soon while the set of ambient IWS sources are the same. Once the set of ambient IWS changes, the device knows that it is has moved and it can check for cellular coverage again. In this way, the method acts as a low-power motion detector that triggers the device to go from a low-frequency coverage checking mode back to normal.

An Example Mobile Device with an Example System

FIG. 1 shows an example system 100 in accordance with the description herein. The illustrated system 100 includes an example mobile device 102, an ambient identifiable wireless signal (IWS) scanning module 104, a tracking module 106, a learning module 108, and a cellular-network scanning module 110. The illustrated ambient IWS scanning module 104 includes a Wi-Fi scanner 114 and a geo-location scanner 114. The illustrated mobile device 102 includes an accelerometer 116 and a gyroscope 118. The combination of the accelerometer 116 and the gyroscope 118 may be termed a movement module. The illustrated cellular-network scanning module 110 includes a scanning-rate adjustment module 120 and a route-update module 122. The illustrated system 100 also includes a place and route database 124. The mobile device 102 is operated by a user 126. The mobile device 102 is coupled to the place and route database 124 via a network 128.

In one or more implementations, the mobile device 102 is a mobile phone. However, the mobile device 102 may be another type of portable device, such as a smartphone, cell phone, tablet computer, any wireless-enabled wearable device, laptop computer, netbook computer, or the like.

In one or more implementations, the ambient IWS scanning module 104 is any suitable technology that is capable of periodically scanning an environment, such as a wireless wide area network (WAN) for ambient IWS sources. For example, the Wi-Fi scanner 112 in the ambient IWS scanning module 104 recognizes 802.11 Wireless Access Points (WAPs) based on the Service Set identifiers (SSIDs) and Basic Service Set Identifications (BSSIDs) of the WAPs observed during the Wi-Fi scans.

Alternatively, the geo-location scanner 114 in the ambient IWS scanning module 104 Global Positioning System (GPS) technology to determine the geographic location of the mobile device 102.

In one or more implementations, the tracking module 106 is any suitable technology that is capable of tracking ambient IWS sources. For example, the tracking module 106 detects, identifies, and records ambient IWS sources encountered by the ambient IWS scanning module 104.

The tracking module 106 also determines whether the mobile device 102 is moving or stationary. For example, the tracking module 106 tracks the ambient IWS sources encountered by the ambient IWS scanning module 104. If the tracking module 106 tracks the same ambient IWS source, then the mobile device 102 is likely stationary. Alternatively, if the tracking module 106 tracks different ambient IWS sources, then the mobile device 102 is likely moving.

In a typical scenario in which the mobile device 102 is not aware of where coverage holes are, the mobile device 102 scans the cellular network for cell towers, cell sites, base stations, base transceiver stations, etc., which provide cell coverage to the mobile device 102.

When the mobile device 102 loses coverage, the mobile device 102 will search for the frequencies that are assigned to it. If the mobile device 102 cannot find coverage on those frequencies, then the mobile device 102 goes into a "roaming" mode and searches for other frequencies. The mobile device 102 is not aware that there is a coverage hole. Thus, the mobile device 102 scans again, in twenty seconds, for example.

If the mobile device 102 cannot find its assigned frequencies or roaming frequencies, the mobile device 102 tries again in a minute, then five minutes, etc. In this scenario, battery power is preserved but the mobile device 102 cannot predict when it will emerge from a coverage hole. Unless you are getting down to say one hour windows, the phone still keeps scanning. As the mobile device 102 keeps looking for a signal, the battery runs down.

In one or more implementations, the learning module 108 determines whether one or more routes traveled by the mobile device 102 or places visited by the device 102 includes one or more cellular network coverage holes. For example, the learning module 108 determines whether the route taken by the mobile device 104 includes any dropped calls and/or a pattern of dropped calls, caused by coverage holes, or determines whether there is a place where coverage is lost every time the device visits the place.

In one or more implementations, the learning module 108 consults the place and route database 124 to determine whether there are any coverage holes along the route the mobile device 102 is traveling or in places the mobile device 102 visits.

The place and route database 124 in one or more implementations includes crowd-sourced data as well as data relating to past behavior of the mobile device 102. When the mobile device 102 is in an area never before visited by it the learning module 108 queries the place and route database 124 about potential points of poor coverage in the area. When the learning module 108 has learned a poor coverage spot it can collaborate with others by contributing information about the location of the poor coverage spot to the place and route database 124.

In one or more implementations, when the mobile device 102 is in a coverage hole the scanning rate adjustment module 120 in the cellular-network scanning module 110 scans the cellular network at a reduced rate. The reduced rate can be no scanning at all or scanning very infrequently. The fact that the ambient IWS scanning module 104 continues to scan for ambient IWS sources looking for 802.11 WAPs, allows the mobile device 102 to detect when it has left a coverage hole. When the mobile device 102 leaves the coverage hole the scanning rate adjustment module 120 adjusts the rate that the cellular network scanning module 110 scans for cell towers to a normal rate.

In another typical scenario, the user 126 finds herself in a place where there appears to be no cellular coverage when the cellular network scanning module 110 scans for cell towers. In addition, the mobile device 102 is stationary because the ambient IWS scanning module 104 keeps hearing the same 802.11 WAP. This is the case when the user 126 has stopped inside a tunnel, for example. The tunnel is not on any known route so there is no history of dropped calls or coverage holes in the route database 124. Even though the location has not been identified as a coverage hole, the mobile device 102 is stationary. Continuing to search for cell towers is fruitless and consumes battery power.

In one or more implementations, when the mobile device 102 is not moving and also has no cellular coverage, the scanning rate adjustment module 120 scans the cellular network at a reduced rate. When the mobile device 102 moves out of the place of no coverage, the scanning rate adjustment module 120 scans the cellular network at a normal rate. When the ambient IWS scanning module 104 hears a different 802.11 WAP the mobile device 102 interprets this as the mobile device 102 is now moving and has left the area that has no coverage (e.g., the tunnel). In one or more implementations, the route-update module 122 updates place and route database 124 using the route learned by the learning module 108 in response to performing the normal rate cellular network scanning with the cellular network scanning module 110.

Example Reduced-Rate Cellular-Network Scanning Operations

Figure 2:
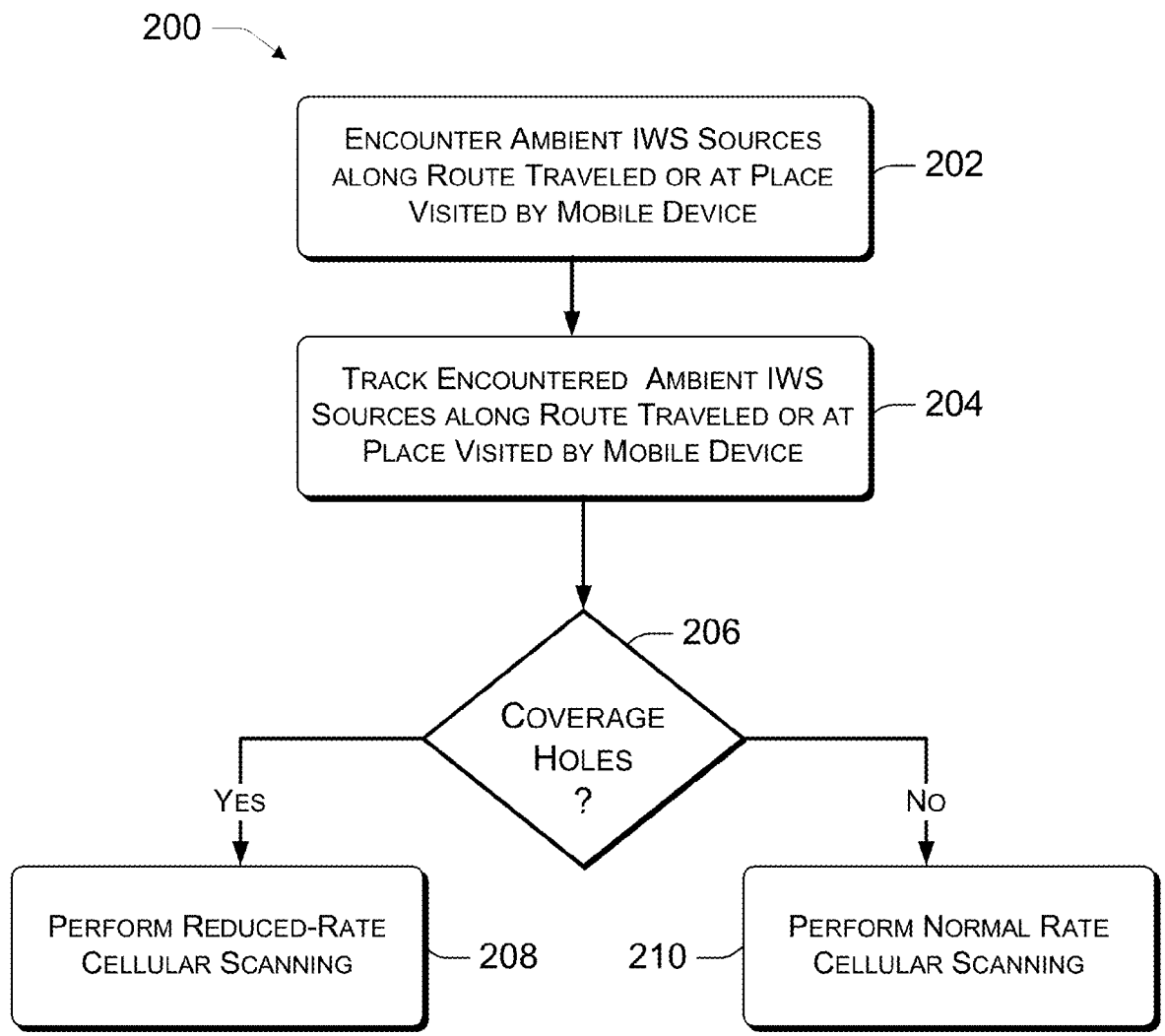
FIG. 2 is a flowchart illustrating a method for implementing reduced-rate cellular-network scanning in accordance with the description herein.

FIG. 2 is a flowchart illustrating a method 200 for implementing reduced-rate cellular-network scanning in accordance with the description herein.

At 202, the method 200 encounters a series of ambient IWS sources scanning while the mobile device 102 is traveling along a route or visiting a place. In one or more implementations, the ambient IWS scanning module 104 encounters the series of ambient IWS sources scanning while the mobile device 102 is traveling along a route or visiting a place. For example, the Wi-Fi scanner 112 scans the system 100 looking for 802.11 WAPs. Alternatively, the geo-location scanner 114 looks for GPS signals to determine the geographic location of the mobile device 102.

At 204, the method 200 tracks the series of ambient IWS sources encountered by the mobile device 102 along the route traveled or in the place visited. In one or more implementations, the tracking module 106 tracks the series of ambient IWS sources encountered by the mobile device 102 along the route traveled or in the place visited.

At 206, the method 200 determines whether there are any cellular network coverage holes along the route traveled by the mobile device 102 or in the place visited by the mobile device 102. In one or more implementations, the learning module 108 consults the place and route database 124 to determine whether there are any coverage holes along the route traveled by the mobile device 102 or the place visited by the mobile device 102.

If at 206 it is determined that there are coverage holes along the route or at the place, then at 208 the method 200 performs reduced rate scanning of the cellular network once the coverage hole is reached. In one or more implementations, the cellular-network scanning module 110, assisted by the scanning-rate adjustment module 120, reduces the rate at which the mobile device 102 scans the cellular network for coverage.

If at 206 it is determined that there are no coverage holes along the route or in the place, then at 210 the method 200 performs normal rate scanning of the cellular network. In one or more implementations, the cellular-network scanning module 110 scans the cellular network for coverage at a normal rate.

Figure 3:
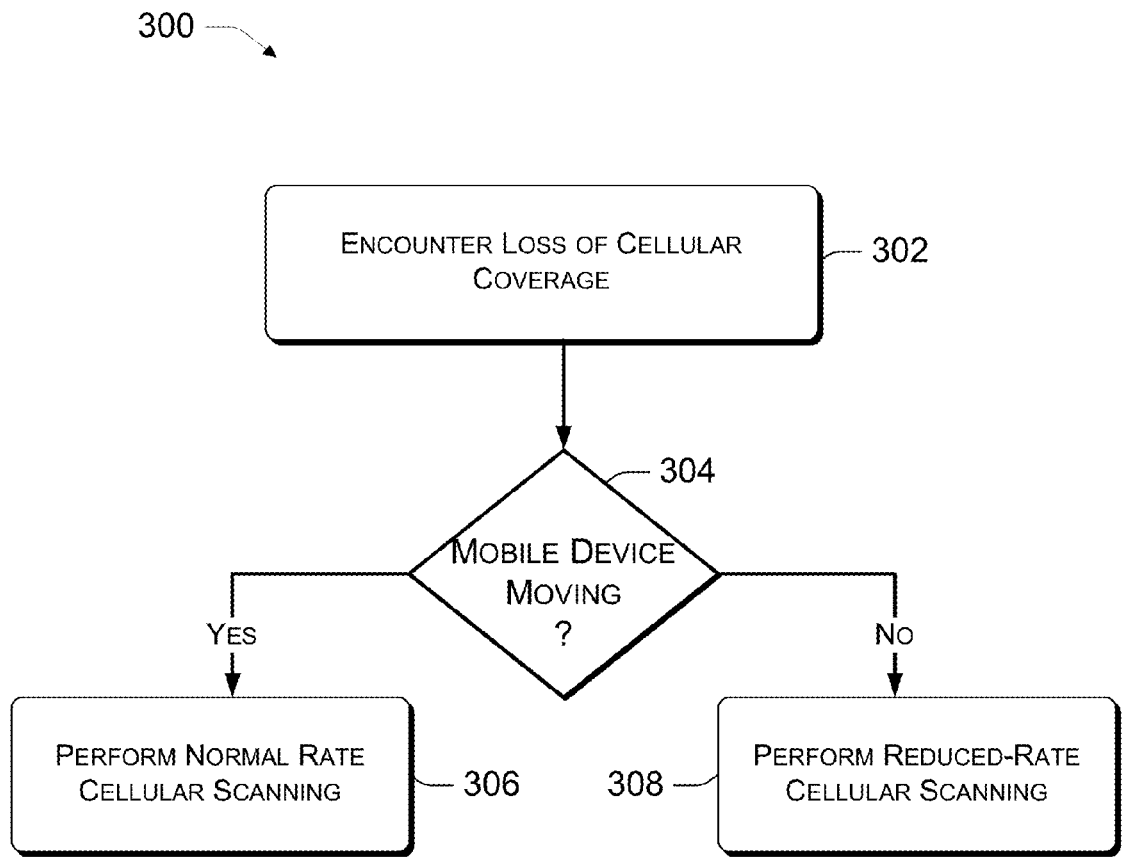
FIG. 3 is a flowchart illustrating an alternative method for implementing reduced-rate cellular-network scanning in accordance with the description herein.

FIG. 3 is a flowchart illustrating an alternative method 300 for implementing reduced-rate cellular-network scanning in accordance with the description herein.

At 302, the method 300 encounters a loss of cellular coverage. In one or more implementations, the cellular-network scanning module 110 determines that the mobile device 102 has encountered a loss of cellular coverage.

At 304, the method 300 determines whether the mobile device 102 is moving or stationary. In one or more implementations, the accelerometer 116 measures dynamic acceleration forces on the mobile device 102 caused by moving, shaking, swinging, vibrating, etc., of the mobile device 102. A lack of dynamic acceleration forces indicates that the mobile device 102 is likely stationary. The presence of acceleration forces indicates that the mobile device 102 is likely moving.

Alternatively or in addition to the measurements taken by the accelerometer 116, in one or more implementations the gyroscope measures the orientation of the mobile device 102 to determine whether the mobile device 102 is tilting, rotating, etc. A lack of angular momentum indicates that the mobile device 102 is likely stationary. A presence of angular momentum like indicates that the mobile device 102 is moving.

If at 304 it is determined that the mobile device 102 is moving, then at 306 the method 300 performs normal rate scanning of the cellular network. In one or more implementations, the cellular-network scanning module 110 scans the cellular network for coverage at a normal rate.

If at 304 it is determined that the mobile device is stationary, then at 308 the method 300 performs reduced rate scanning of the cellular network. In one or more implementations, the cellular-network scanning module 110, assisted by the scanning-rate adjustment module 120, reduces the rate at which the mobile device 102 scans the cellular network for coverage.

Figure 4:
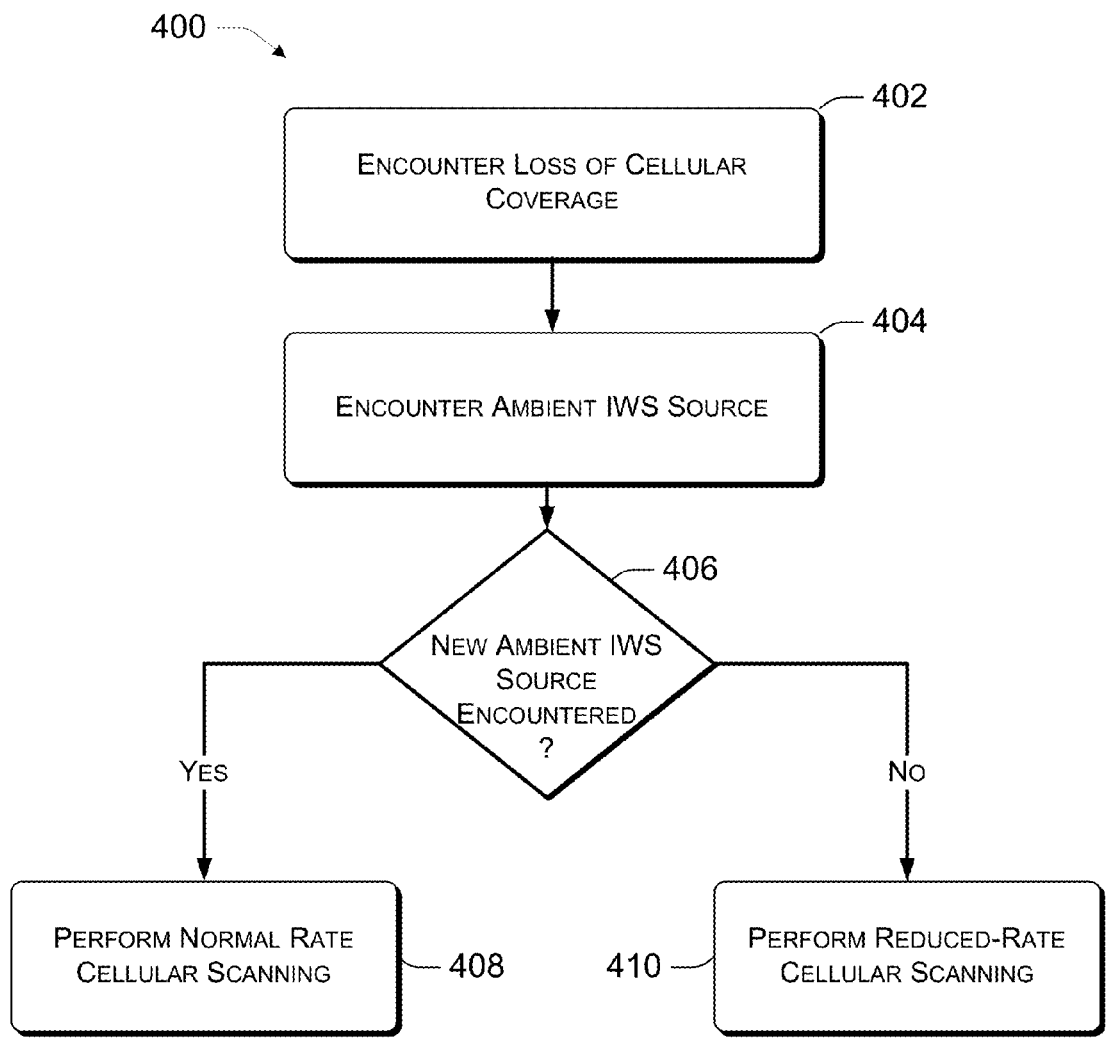
FIG. 4 is a flowchart illustrating an alternative method for implementing reduced-rate cellular-network scanning in accordance with the description herein.

FIG. 4 is a flowchart illustrating an alternative method 400 for implementing reduced-rate cellular-network scanning in accordance with the description herein. Method 400 is operating in a scenario where the mobile device is not on a known route but the device can observe unknown IWS sources.

At 402, the method 400 encounters a loss of cellular coverage.

At 404, the method 400 encounters an ambient IWS source. In one or more implementations, the ambient IWS scanning module 104 encounters an ambient IWS source. For example, the Wi-Fi scanner 112 scans the system 100 looking for 802.11 WAPs and finds one. Alternatively, the geo-location scanner 114 looks for a GPS signals and finds one.

At 406, the method 400 determines whether the mobile device 102 encounters a new ambient IWS source. In one or more implementations, the ambient IWS scanning module 104 continues to look for new ambient IWS sources. If a new ambient IWS source is encountered it means that the device is moving. In this case, then at 408 the scanning rate adjustment module 120 scans the cellular network at a normal rate. If no new IWS sources are encountered, it means the device is still likely to be in the coverage hole. Accordingly, then at 410 the scanning rate adjustment module 120 scans the cellular network at a reduced rate.

Example Computer System

Figure 5:
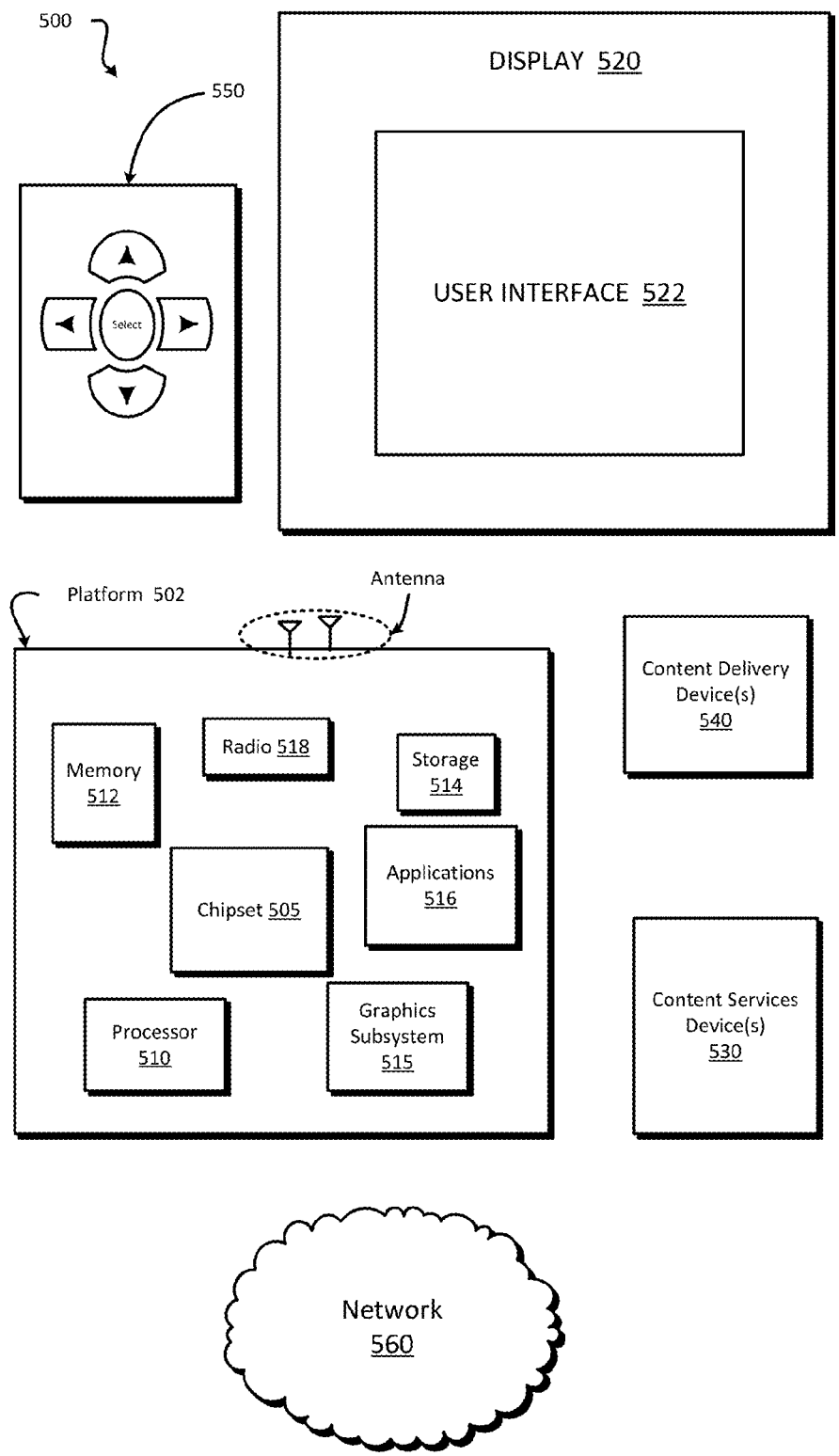
FIG. 5 is a high-level block diagram illustrating an example computer system suitable for implementing the technology described herein.

FIG. 5 illustrates an example system 500 that may implement, at least in part, the technologies described herein. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 515 and/or radio 515. Chipset 505 may provide intercommunication among processor 55, memory 512, storage 514, graphics subsystem 515, applications 515 and/or radio 515. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, Display Port, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. In addition, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 550 to communicate (e.g., send and/or receive) media information to and from network 550. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 500 may be embodied in varying physical styles or form factors. FIG. 5 illustrates implementations of a small form factor device in which system 500 may be embodied. In embodiments, for example, device 102 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
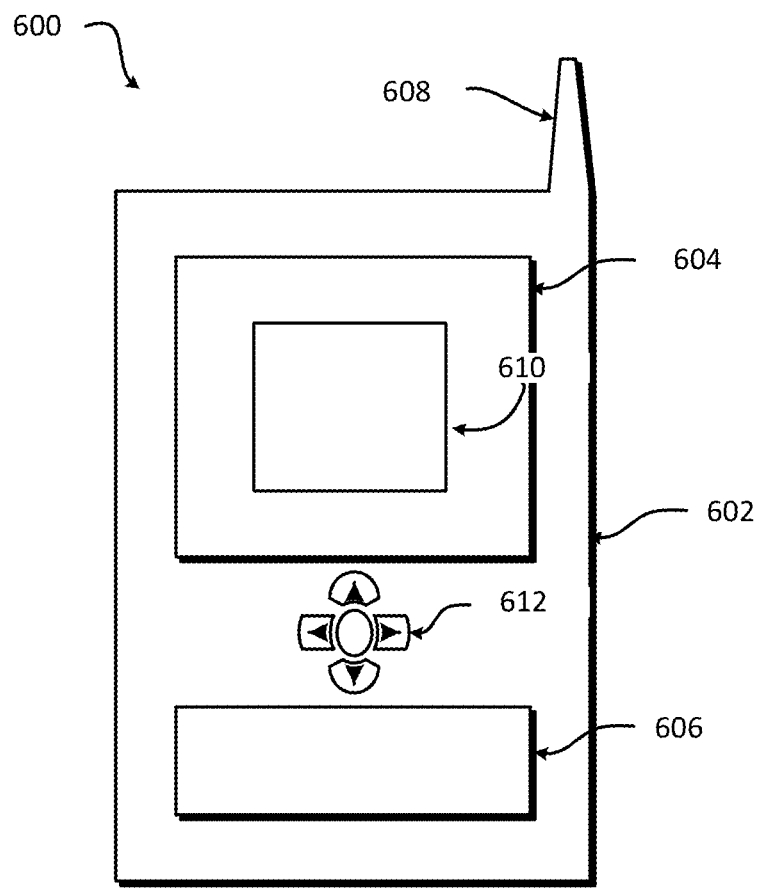
FIG. 6 illustrates an example device for implementing reduced-rate cellular-network scanning in accordance with the description herein.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

ADDITIONAL OR ALTERNATIVE
IMPLEMENTATIONS DETAILS

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

For example, it will be appreciated that several of the above-disclosed and other features and functions, or alternatives thereof, may be combined into many other different systems or applications. Also, it will be appreciated that various presently unforeseen or unanticipated alternatives, modifications, variations or improvements therein may be subsequently made by those skilled in the art, which are also intended to be encompassed by the claims that follow.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A mobile device comprising:
    an ambient identifiable wireless signal (IWS) scanning module that is configured to encounter a series of ambient IWS sources while the mobile device is traveling along a route;
    a tracking module that is configured to track the encountered series of ambient IWS sources along the route traveled by the mobile device;
    a learning module that is configured to learn the route the mobile device is traveling along in response to tracking the encountered series of ambient IWS sources, and to determine whether the route includes one or more cellular network coverage holes, wherein the learning module is further configured to determine whether the route includes one or more cellular network coverage holes, the cellular-network coverage-hole determination is based on past behavior along the route; and
    a cellular network scanning module that, in response to a determination that the route fails to include one or more cellular network coverage holes, is configured to perform a normal rate of cellular network scanning and, in response to a determination that the route includes one or more cellular network coverage holes, is configured to perform a reduced rate of cellular network scanning.

2. A mobile device according to claim 1 wherein the cellular network scanning module is further configured to update the route learned by the learning module in response to performing the normal rate cellular network scanning.

3. A mobile device according to claim 1 wherein the ambient IWS scanning module includes a Wi-Fi scanner.

4. A mobile device according to claim 1 wherein the ambient IWS scanning module includes a geo-location scanner.

5. A mobile device according to claim 1 wherein the past behavior includes crowd-sourced past behavior along the route.

6. A mobile device according to claim 1 wherein the past behavior includes past behavior of the mobile device along the route.

7. A mobile device according to claim 1 wherein the learning module is configured to determine whether the route includes one or more cellular network coverage holes based on dropped calls along the route.

8. One or more non-transitory computer-readable media storing processor-executable instructions that when executed cause one or more processors to perform operations comprising:
    encountering a series of ambient identifiable wireless signal (IWS) sources scanning while a mobile device is traveling along a route;
    tracking the encountered series of ambient IWS sources along the route traveled by the mobile device;
    in response to tracking the encountered series of ambient IWS sources, determining whether the route includes one or more cellular network coverage holes, the determining being based on past behavior along the route; and
    performing a normal rate of cellular network scanning in response to a determination that the route fails to include one or more cellular network coverage holes;
    in response to a determination regarding whether the route includes one or more cellular network coverage holes, performing a reduced rate of cellular network scanning.

9. One or more non-transitory computer-readable media according to claim 8 wherein the ambient IWS scanning module includes a Wi-Fi scanner.

10. One or more non-transitory computer-readable media according to claim 8 wherein the ambient IWS scanning module includes a geo-location scanner.

11. One or more non-transitory computer-readable media according to claim 8 wherein the past behavior along the route includes crowd-sourced data of past behavior along the route.

12. One or more non-transitory computer-readable media according to claim 8 wherein the past behavior along the route includes past behavior of the mobile device along the route.

13. One or more non-transitory computer-readable media according to claim 8 wherein determining whether the route includes one or more cellular network coverage holes includes determining whether the route includes one or more cellular network dropped calls along the route.

14. A mobile device comprising:
    an ambient identifiable wireless signal (IWS) scanning module that is configured to encounter a series of ambient IWS sources while the mobile device is located at a place;
    a tracking module that is configured to track the encountered series of ambient IWS sources at the place;
    a learning module that is configured to learn the place the mobile device is located and, in response to tracking the encountered series of ambient IWS sources, to determine whether the place includes one or more cellular network coverage holes, the cellular-network coverage-hole determination being based on past behavior at the place; and
    a cellular network scanning module that, in response to a determination that the place fails to include one or more cellular network coverage holes, is configured to perform a normal rate of cellular network scanning and, in response to a determination that the place includes one or more cellular network coverage holes, is configured to perform a reduced-rate of cellular network scanning.

15. A mobile device according to claim 14 wherein the cellular network scanning module is further configured to update the place learned by the learning module in response to performing the normal rate cellular network scanning.

16. A mobile device according to claim 14 wherein the ambient IWS scanning module includes a Wi-Fi scanner.

17. A mobile device according to claim 14 wherein the ambient IWS scanning module includes a geo-location scanner.

18. A mobile device according to claim 14 wherein the past behavior includes crowd-sourced past behavior at the place.

19. A mobile device according to claim 14 wherein the past behavior past behavior of the mobile device at the place.

20. A mobile device according to claim 14 wherein the learning module is configured to determine whether the place includes one or more cellular network coverage holes based on dropped calls at the place.

21. One or more non-transitory computer-readable media storing processor-executable instructions that when executed cause one or more processors to perform operations comprising:
encountering a series of ambient identifiable wireless signal (IWS) sources scanning while the mobile device is located at a place;
tracking the encountered series of ambient IWS sources at the place;
in response to tracking the encountered series of ambient IWS sources, determining whether the place includes one or more cellular network coverage holes, the determining being based on past behavior at the place; and
performing a normal rate of cellular network scanning in response to a determination that the route fails to include one or more cellular network coverage holes;
in response to a determination regarding whether the place includes one or more cellular network coverage holes, performing a reduced rate of cellular network scanning.

22. One or more non-transitory computer-readable media according to claim 21 wherein the performing a reduced rate of cellular network scanning is in response to a determination that the place includes one or more cellular network coverage holes.

23. One or more non-transitory computer-readable media according to claim 21 wherein the ambient IWS scanning module includes a Wi-Fi scanner.

24. One or more non-transitory computer-readable media according to claim 21 wherein the ambient IWS scanning module includes a geo-location scanner.

25. One or more non-transitory computer-readable media according to claim 21 wherein the past behavior includes crowd-sourced data of past behavior at the place.

26. One or more non-transitory computer-readable media according to claim 21 wherein the past behavior includes past behavior of the mobile device at the place.

27. One or more non-transitory computer-readable media according to claim 21 wherein determining whether the place includes one or more cellular network coverage holes includes determining whether the place includes one or more cellular network dropped calls along the route.

* * * * *